(12) United States Patent
Schaber

(10) Patent No.: US 10,473,128 B2
(45) Date of Patent: Nov. 12, 2019

(54) ACTUATING DRIVE FOR A CONTROL VALVE, IN PARTICULAR STEAM TURBINE CONTROL VALVE AND METHOD FOR OPERATING SAME

(71) Applicant: VOITH PATENT GMBH, Heidenheim (DE)

(72) Inventor: Hubert Schaber, Rutesheim (DE)

(73) Assignee: Voith Patent GmbH, Heidenheim (DE)

( * ) Notice: Subject to any disclaimer, the term of this patent is extended or adjusted under 35 U.S.C. 154(b) by 159 days.

(21) Appl. No.: 15/537,733

(22) PCT Filed: Oct. 28, 2015

(86) PCT No.: PCT/EP2015/074963
§ 371 (c)(1),
(2) Date: Jun. 19, 2017

(87) PCT Pub. No.: WO2016/096222
PCT Pub. Date: Jun. 23, 2016

(65) Prior Publication Data
US 2018/0274568 A1    Sep. 27, 2018

(30) Foreign Application Priority Data

Dec. 19, 2014    (DE) .................. 10 2014 226 672

(51) Int. Cl.
*F15B 20/00*    (2006.01)
*F15B 21/042*    (2019.01)
(Continued)

(52) U.S. Cl.
CPC ............ *F15B 20/007* (2013.01); *F01D 17/18* (2013.01); *F15B 1/025* (2013.01); *F15B 21/042* (2013.01);
(Continued)

(58) Field of Classification Search
CPC .... F15B 20/007; F15B 13/021; F15B 21/042; F15B 1/025; F01D 17/18; F01D 17/26; F16K 31/12
See application file for complete search history.

(56) References Cited

U.S. PATENT DOCUMENTS

| 4,589,444 | A | 5/1986 | Masek et al. |
| 9,328,842 | B2 * | 5/2016 | Tauber .................. F15B 20/008 |
| 2010/0006165 | A1 | 1/2010 | Banta et al. |

FOREIGN PATENT DOCUMENTS

| DE | 4030107 A1 | 3/1992 |
| EP | 0055351 A1 | 7/1982 |

(Continued)

*Primary Examiner* — Abiy Teka
(74) *Attorney, Agent, or Firm* — Laurence A. Greenberg; Werner H. Stemer; Ralph E. Locher

(57) ABSTRACT

An actuating drive for a control valve contains a working cylinder which has a piston and a piston rod and forms an actuator for the control valve. The piston bounds a first pressure space and a second pressure space to displace the piston counter to the force of a spring by applying pressure to the first pressure space via a working medium. A working medium circuit is connected to the working cylinder at first and second pressure connections to introduce and evacuate the working medium into/from the first and second pressure spaces. The working medium circuit has a working medium pump connected to convey the working fluid, at a pressure side, to the first pressure connection, and at a suction side, to the second pressure connection. The first pressure space is permanently connected, so as to convey working fluid, to the second pressure space via a bypass line.

14 Claims, 1 Drawing Sheet

(51) Int. Cl.
*F01D 17/18* (2006.01)
*F15B 1/02* (2006.01)
*F16K 31/12* (2006.01)

(52) U.S. Cl.
CPC ............... *F16K 31/12* (2013.01); *F15B 1/02* (2013.01); *F15B 2211/20* (2013.01); *F15B 2211/20515* (2013.01); *F15B 2211/20538* (2013.01); *F15B 2211/20569* (2013.01); *F15B 2211/3058* (2013.01); *F15B 2211/30505* (2013.01)

(56) References Cited

FOREIGN PATENT DOCUMENTS

| | | |
|---|---|---|
| EP | 0127027 B1 | 12/1984 |
| EP | 2620655 A1 | 7/2013 |
| JP | H06313410 A | 11/1994 |
| WO | 2014176252 A1 | 10/2014 |

* cited by examiner

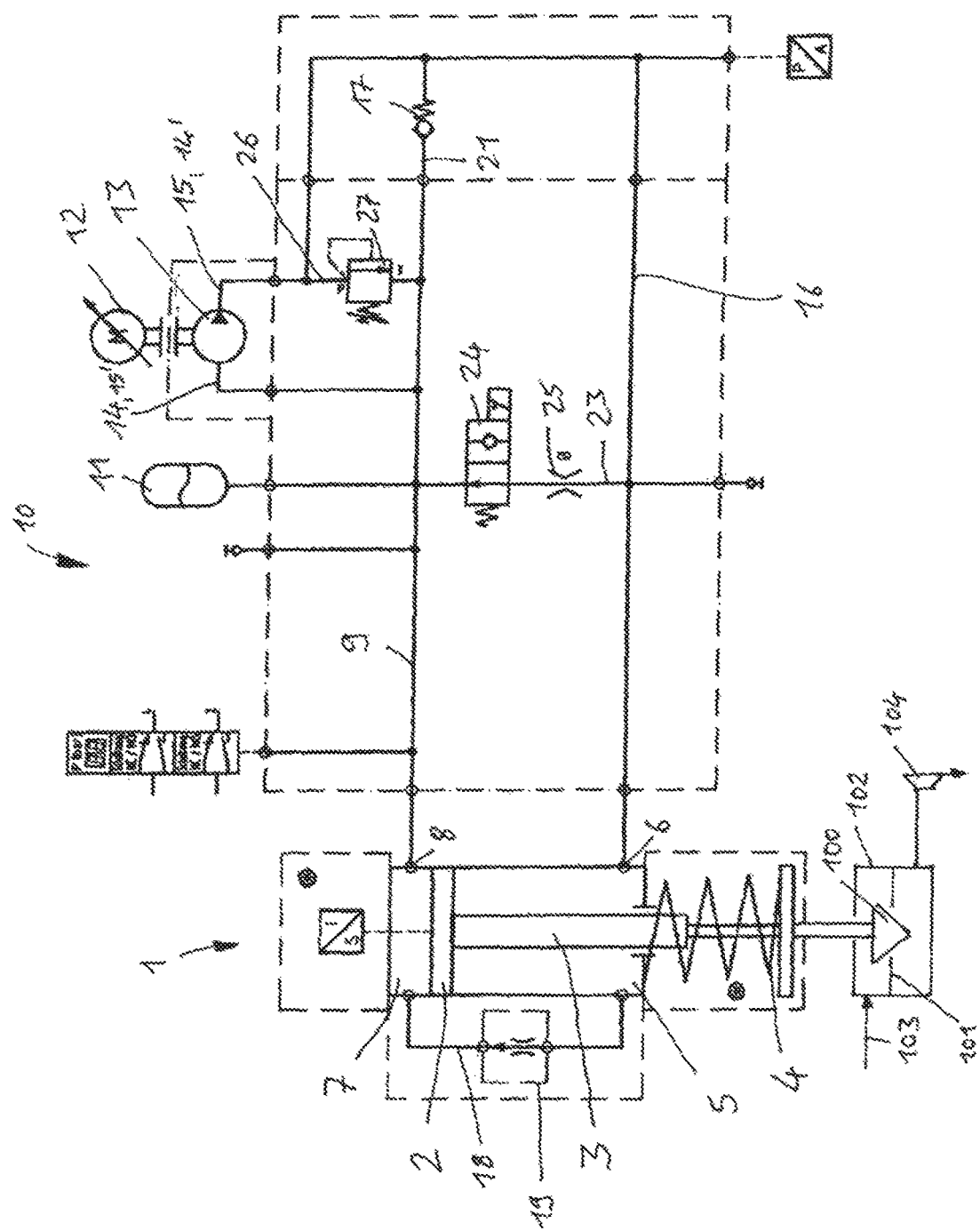

ACTUATING DRIVE FOR A CONTROL VALVE, IN PARTICULAR STEAM TURBINE CONTROL VALVE AND METHOD FOR OPERATING SAME

BACKGROUND OF THE INVENTION

Field of the Invention

The present invention relates to an actuating drive for a regulation valve, in particular for a steam turbine regulation valve, as per the preamble of the main claim and to a method for operating the same.

In steam power plants, the steam generated by means of a steam generator is supplied via at least one, generally two to four, steam turbine regulation valves to the steam turbine, in which said steam is expanded, generating mechanical work, and said steam is subsequently supplied to a condenser for condensation purposes. The steam turbine regulation valves are positioned in parallel steam feed lines of the steam turbine in order that the extremely large steam volume flows can be distributed to the different steam turbine regulation valves. Despite the distribution, the steam volume flows per valve remain so large that the valves generally weigh several tons, and, correspondingly, the valve body has a high weight, which must be moved by a correspondingly powerful actuating drive.

For the drive of the regulation valves, use is thus generally predominantly made of hydraulic or possibly also pneumatic actuating drives, which have a working cylinder, with a piston rod connected to a piston, as actuator for the valve body of the respective regulation valve, in order that, by retraction of the piston rod into and deployment of the piston rod out of the working cylinder, the valve body is actuated so as, for example in the steam power plant mentioned, to close the flow cross section of the steam turbine regulation valve to a greater or lesser extent.

For the displacement of the piston with the piston rod in the working cylinder, the piston delimits at least one pressure chamber into which a pressurized working medium, either a hydraulic working medium, for example oil, or a pneumatic working medium, for example air, can be introduced in order to displace the piston counter to the force of a spring. The pressure of the working medium is built up by means of a working medium pump in the external working medium circuit, to which the working cylinder is connected by means of at least one corresponding pressure port of the pressure chamber. Since, as is the case in an embodiment of the present invention, the external working medium circuit is generally designed as a closed circuit, said working medium circuit generally has not only a pressure line, via which the pressurized working medium is introduced from the working medium pump into the first pressure chamber, but also a tank line, which tank line conducts working medium out of a second pressure chamber via a second pressure port of the second pressure chamber, which second pressure chamber is positioned on that side of the piston which is averted from the first pressure chamber and which second pressure chamber is delimited with respect to the first pressure chamber by means of the piston, and which tank line feeds said working medium for example to the suction side of the working medium pump. In this way, a double-acting working cylinder for the retraction and deployment of the piston can be realized.

EP 0 055 351 A1 describes a corresponding electrohydraulic actuating drive, having a double-acting working cylinder connected to an external working medium circuit, wherein, in the external working medium circuit, a working medium pump conveys working medium from a working medium reservoir via a check valve into either a first pressure chamber or a second pressure chamber of the working cylinder in order to deploy the piston rod thereof with action in the same direction as the force of a compression spring or in order to retract the piston rod thereof counter to the force of the compression spring. The degree of opening of a turbine regulation valve is determined by means of the position of the piston or of the piston rod. For the rough positioning of the piston in the working cylinder, a binary throughflow switch in the form of a four-way switching slide valve with three switching positions is provided, the two control lines of which are connected to the pressure chambers on both sides of the piston in the working cylinder, and which is furthermore connected via a pressure line to the pressure side of the pump and by means of a tank line to the working medium reservoir. For the fine positioning of the piston, an electrohydraulic transducer in the form of a pilot-controlled servo valve is provided.

A disadvantage of the actuating drive as per EP 0 055 351 A1 is that the efficiency is limited by the throttling losses at the control edges of the throttling directional valves, which are in the form of continuously adjustable valves. Furthermore, high demands are placed on a constant supply pressure in order that the position of the piston in the working cylinder can be regulated in an exact manner.

DE 40 30 107 A1 describes a corresponding actuating drive in which throttling losses owing to continuously adjustable valves are substantially avoided. In said actuating drive, which likewise has a working cylinder with two pressure chambers which are connected to an external working medium circuit with a working medium pump, the working medium pump, which is designed as a constant-displacement pump and which is driven by means of a rotational-speed-regulated motor, is used to pump working medium via a check valve, which is open in the conveying direction, into a first pressure chamber of the working cylinder, such that the piston with the piston rod retracts counter to the force of a compression spring. A disadvantage is that the deployment of the piston rod is effected exclusively by the force of the compression spring, whereby the dynamic actuation characteristic is asymmetrical and, in the direction of the spring force, is defined only by the hydraulic-mechanical configuration of the flow resistance and cannot be influenced by electrical control signals. Furthermore, the working medium pump must be capable of being able to start up counter to the pressure prevailing in the pressure chamber of the working cylinder over all rotational speed ranges.

It is also the case in the actuating drive as per EP 2 620 655 A1 that throttling losses in continuously adjustable valves are substantially avoided, and, furthermore, a working medium pump driven by a servomotor is provided in the external working medium circuit, which working medium pump is of variable rotational speed and can pump working medium from a first pressure chamber of the working cylinder into a second pressure chamber of the working cylinder and vice versa in order to thereby rapidly adjust the desired position of the piston and thus of the piston rod. Here, however, there is likewise the disadvantage that the working medium pump must be capable of operating counter to the working medium pressure in the two pressure chambers of the working cylinder over all rotational speed ranges, and a relatively expensive synchronous servomotor is required for dynamic and precise control. Furthermore, the working medium pump must be capable, in the static state of the piston, of imparting a holding pressure counter to the spring which exerts pressure on the piston. The torque required for the holding pressure at low rotational speed is a thermally unfavorable operating situation for the motor of the working medium pump. Also, the working medium pump tends to overheat in the case of high pressures and a low volume flow, which is required for the fine positioning of the piston.

EP 0 127 027 B1 discloses an actuating drive for a regulation valve, having a working cylinder which forms an actuator for the regulation valve, in which the two pressure chambers of the working cylinder are connected by means of a connecting line with a throttle arranged therein.

SUMMARY OF THE INVENTION

The present invention is based on the object of specifying an actuating drive for a regulation valve, in particular steam turbine regulation valve of the type described in the introduction, and of specifying a method for the operation of an actuating drive of said type, by means of which throttling losses in the external working medium circuit are advantageously avoided, wherein the actuating drive exhibits low production costs and advantageously operates in a manner which avoids thermally unfavorable operating states of the working medium pump and of a motor which drives the latter.

The object according to the invention is achieved by means of an actuating drive and a method for operating the same as per the independent claims. The dependent claims specify advantageous and particularly expedient refinements of the invention.

An actuating drive according to the invention for a regulation valve, in particular steam turbine regulation valve, has a working cylinder. The working cylinder comprises a piston with a piston rod connected thereto, which piston rod forms an actuator for the regulation valve. The piston rod can correspondingly be deployed out of and retracted into the working cylinder in order to thereby define the opening cross section of the regulation valve, for example owing to direct or indirect connection of the piston rod to a valve body of the regulation valve, such that the valve body opens a flow cross section of the regulation valve to a greater or lesser extent in a manner dependent on the position of the piston rod.

The piston of the working cylinder delimits at least one first pressure chamber of the working cylinder, and the first pressure chamber has a first pressure port for the introduction of a pressurized working medium into the first pressure chamber for the purposes of displacing the piston with the piston rod, by exertion of pressure, counter to a force of a spring, in particular compression spring, which is assigned to the working cylinder. For example, with increasing pressurization in the first pressure chamber, the piston rod retracts ever further into the working cylinder, and, with decreasing pressurization in the first pressure chamber, the piston rod is deployed out of the working cylinder. It is advantageously the case that, with decreasing pressurization in the first pressure chamber, a second pressure chamber provided on that side of the piston which is averted from the first pressure chamber is simultaneously increasingly charged with working medium pressure, as will be discussed in more detail below.

According to the invention, the working cylinder has a second pressure chamber with a second pressure port, wherein it should not imperatively be derived from the term "pressure port" that a positive pressure must prevail therein or that the second pressure chamber is pressurized with working medium. Rather, in one embodiment, it is also possible for working medium to be discharged from the second pressure chamber via the second pressure port when the second pressure chamber is reduced in volume as a result of displacement of the piston, without the pressurized introduction of working medium into the second pressure chamber when the latter is increased in volume during an oppositely directed piston stroke. An alternative embodiment however provides that pressurized working medium is introduced alternately into the first pressure chamber and into the second pressure chamber, in order that the piston is displaced in the first and in the second direction by means of said pressurization and not solely by the force of the spring in the working cylinder.

The actuating drive according to the invention has an external working medium circuit to which the working cylinder is connected by means of its first and its second pressure port for the purposes of introducing working medium into and discharging working medium out of the first and second pressure chambers. In the external working medium circuit there is provided a working medium pump driven by means of a motor, which working medium pump has a suction side and a pressure side and is, by means of the pressure side, connected in working-medium-conducting fashion via a pressure line to the first pressure port and is, by means of the suction side, connected via a tank line to the second pressure port.

According to the invention, the first pressure chamber is permanently connected in working-medium-conducting fashion via a short-circuit line to the second pressure chamber.

By means of the refinement according to the invention, a continuous working medium flow from the pressure side to the suction side of the working medium pump is made possible, even when the piston is held static in the working cylinder. Thus, the working medium pump constantly conveys a volume flow, in the present case referred to as idle volume flow, which idle volume flow can be selected to be of such a magnitude that the heat losses of the working medium pump, and in particular of the motor that drives the working medium pump, can be discharged by means of said idle volume flow, and which idle volume flow is so small that the additional working medium volume flow that has to be imparted by the working medium pump during the adjustment of the piston does not impair the normal actuating operation.

The working medium pump, which is driven for example by a variable-rotational-speed motor, in particular electric motor, is advantageously connected directly, without throttling valves such as directional valves, and in particular without check valves, to the first pressure chamber of the working cylinder or to the first pressure port.

The working medium pump is advantageously positioned in the external working medium circuit such that, by means of said working medium pump, working medium can be conveyed both into and out of the first pressure chamber. In a first embodiment, this is achieved by reversal of the direction of rotation of the working medium pump. In an alternative embodiment, the direction of rotation of the working medium pump can be maintained, but with the pressure side and the suction side of the working medium pump being connected alternately to the pressure line, for example by virtue of a suction line branching off from the pressure line, which suction line opens into the tank line or opens out on the suction side of the working medium pump, and an externally activated shut-off valve or switching valve being provided for the purposes of connecting the pressure line to the suction side of the working medium pump. At the same time, the tank line should then be connectable to the pressure side of the working medium pump, possibly likewise by means of a line with shut-off valve or which is also connected to the switching valve.

If the working medium pump can be driven in two directions of rotation and thus the pressure side and the suction side of the working medium pump can be interchanged, corresponding line routing, which may also be realized within the pump, is not necessary. Consideration may self-evidently also be given to other measures for achieving the desired change in direction during the movement of the piston.

Both in a refinement of the invention with a working medium pump which is reversible in terms of direction of rotation, and in a refinement with alternate connection of the pressure side and of the suction side to the pressure line, provision may be made for the working medium pump to be designed as a hydraulic motor and such that it can drive the motor of the working medium pump as a generator, such that, when working medium is conducted from the first pressure chamber into the second pressure chamber, the working medium pump is driven as a hydraulic motor and drives the motor as a generator. Thus, the energy previously imparted for the actuation stroke in order to overcome the force of the spring of the working cylinder can be partially recovered and electrically stored. The conversion of the kinetic energy into electrical energy may be realized in a power converter of the motor.

In the short-circuit line, which in one embodiment of the invention is connected, in parallel with respect to the ports of the pressure line and tank line or in parallel with respect to the external working medium circuit, to the working cylinder, or is integrated into said working cylinder, there may be provided a throttle with a constant flow cross section, which defines the volume flow of the working medium from the pressure side to the suction side of the working medium pump in the static state of the piston, and thus the volume conveyed by the working medium pump at idle. Alternatively, a throttle with a variably adjustable flow cross section, or a regulation valve, may be provided in the short-circuit line in order to control or regulate the idle volume flow, for example such that the volume flow or mass flow of the working medium through the short-circuit line is constant.

The short-circuit line may for example be provided so as to branch off from the pressure line, and so as to open into the tank line, outside the external working medium circuit, which is connected in working-medium-conducting fashion to the first and to the second pressure port, or in the working medium circuit. It is also possible for the short-circuit line to be integrated in the working cylinder, for example by means of ducts and/or lines in a housing of the working cylinder.

It is advantageously provided that a fast-closure line which opens into the tank line branches off from the pressure line. In the fast-closure line there may be provided a fast-closure valve for the purposes of opening up or blocking the fast-closure line. By opening up the fast-closure line, the piston of the working cylinder can be quickly placed into a fail-safe position. In particular if the fast-closure valve is designed as an unregulated open/closed valve, it is advantageous for a constant or adjustable throttle to additionally be provided in the fast-closure line in series with respect to the fast-closure valve, in order to define or variably set the stroke speed of the piston during the opening of the fast-closure valve.

There may be connected to the tank line a working medium reservoir which the working medium pump conveys from and/or which serves for the compensation of volume fluctuations in the external working medium circuit.

To limit the maximum pressure in the pressure line, it is advantageously the case that a positive-pressure line with a positive-pressure valve branches off from the pressure line, which positive-pressure line opens into the tank line.

In one exemplary embodiment of the invention, a reversing line branches off from the tank line, in which reversing line a check valve or a shut-off valve is provided. The check valve opens in particular in the direction of the pressure line and closes in the direction of the tank line. It is thus possible, in the presence of a higher pressure in the tank line than in the pressure line, for working medium to be conducted past the working medium pump from the tank line into the pressure line and thus from the second pressure chamber into the first pressure chamber.

In the method according to the invention, the working medium pump of the actuating drive is operated permanently and working medium is conveyed from the pressure side of the working medium pump to the suction side of the working medium pump via the short-circuit line, such that heat that is generated in the working medium pump can be discharged from the working medium pump with said conveyed working medium volume flow. This conveying also occurs when the piston is held static in the working cylinder.

Even though a preferred field of use of the actuating drive is for the drive of a steam turbine regulation valve, the actuating drive may also be used for the drive of other regulation valves, for example of gas turbines or else of other assemblies.

BRIEF DESCRIPTION OF THE DRAWING

The invention will be described by way of example below on the basis of an exemplary embodiment and on the basis of the FIGURE.

DESCRIPTION OF THE INVENTION

The single FIGURE of the drawing illustrates an exemplary embodiment of an actuating drive according to the invention, comprising a working cylinder 1 in which a piston 2 divides a first pressure chamber 5 from a second pressure chamber 7 and which is connected to a piston rod 3 for the purposes of alternately retracting the piston rod 3 into the working cylinder 1 or deploying the piston rod 3 out of the working cylinder 1 in a manner dependent on the introduction of working medium into the first pressure chamber 5 and/or second pressure chamber 7. The piston 2 is preloaded by a spring 4, in this case in the direction of a deployment of the piston rod 3.

In the exemplary embodiment illustrated, the piston rod 3 serves as an actuator for a steam turbine regulation valve 102, which is arranged in the steam feed line 103 of a steam turbine 104. By means of the piston rod 3, a valve body 100 can be displaced relative to a valve seat 101 in order to open or close the steam turbine regulation valve 102 to a greater or lesser extent. In the exemplary embodiment shown, the spring 4 or the deployment of the piston rod 3 out of the working cylinder 1 effects a closure of the steam turbine regulation valve 102. It would however also be possible for some other logic to be selected, or for some valve other than a steam turbine regulation valve 102 to be actuated by means of the actuating drive.

The working cylinder 1 is connected to an external working medium circuit 10, which has a pressure line 16, which is connected to a first pressure port 6 of the first pressure chamber 5, and a tank line 9, which is connected to a second pressure port 8 of the second pressure chamber 7.

In the external working medium circuit 10 there is provided a working medium pump 13 which is driven by a motor 12, in particular electric motor. The working medium pump 13 has a suction side 14 and a pressure side 15. On the side of the suction side 14, there is connected to the tank line 9 a working medium reservoir 11 for the purposes of compensating volume fluctuations in the external working medium circuit 10.

By means of the working medium pump 13, working medium can be conveyed from the suction side 14 to the pressure side 15 and via the pressure line 16 into the first pressure chamber 5 for the purposes of retracting the piston rod 3 into the working cylinder 1 counter to the force of the spring 4. To deploy the piston rod 3 out of the working cylinder 1, it is firstly possible to utilize the force of the spring 4, and it is advantageously possible for the working medium pump 13 to be operated as a hydraulic motor, such that working medium flows through the working medium pump 13 from the pressure side 15 to the suction side 14, and thus the working medium pump 13 is hydraulically driven and drives the motor 12 as a generator. The drive energy can then be converted in the motor 12, or in a connected converter, and stored, in particular in the form of electrical energy.

Provision may additionally or alternatively also be made for the working medium pump 13 to be driven by the motor 12 in a direction of rotation opposite to the direction of rotation described above with regard to the retraction of the piston rod 3 into the working cylinder 1, and thus for the pressure side 15 to become the suction side 14' and for the suction side 14 to become the pressure side 15'. Then, working medium is actively pumped by means of the working medium pump 13 from the first pressure chamber 5 into the second pressure chamber 7, and a force is additionally exerted on the piston 2, which force is in the same direction as the force of the spring 4.

If the piston 2, and thus the piston rod 3, are now held static in the working cylinder 1, it would be necessary for the working medium pump 13 to impart the pressure for compensating the force of the spring 4 in the case of a very small volume flow through the working medium pump 13. This would lead to heating-up of the working medium pump 13, because the small volume flow is not capable of discharging heat from the working medium pump 13. According to the invention, a short-circuit line 18 is therefore provided which permanently connects the first pressure chamber 5 in working-medium-conducting fashion to the second pressure chamber 7. Owing to said permanent conducting of working medium, the working medium flow conveyed through the working medium pump 13 is increased, such that the desired discharging of heat is realized even when the piston 2 is in the static state.

In the exemplary embodiment shown, there is provided in the short-circuit line 18 a short-circuit valve 19, for example in the form of a throttle with a constant or variable flow cross section, or in the form of a regulation valve. In this way, the working medium flow passing through the short-circuit line 18 can either be set in pressure-dependent fashion or actively changed, for example held constant independently of pressure.

In the exemplary embodiment shown, a reversing line 21 in which a check valve 17 is provided branches off from the tank line 9. The check valve 17 opens in the direction of the pressure line 16 and closes in the direction of the tank line 9. It is thus possible, whenever a higher working medium pressure prevails in the tank line 9 than in the pressure line 16, wherein the required relative positive pressure is defined by the spring force of the check valve 17, for working medium to flow from the tank line 9 into the pressure line 16 and thus from the second pressure chamber 7 into the first pressure chamber 5, specifically bypassing the working medium pump 13. In this way, in the event of possible erroneous operation, a situation is avoided in which the working medium pump 13 falls into a negative-pressure range during reversing operation. This would be the case if the piston 2 can move no further but the working medium pump 13 would simultaneously continue to operate in reversing operation.

A fast-closure line 23 with a fast-closure valve 24 branches off from the pressure line 16 in order that, as a result of opening of the fast-closure valve 24, as fast as possible a movement of the piston 2 is effected by the force of the spring 4 in order to attain a fail-safe position. Here, the stroke speed is defined by the throttle 25 which is likewise provided, in series with respect to the fast-closure valve 24, in the fast-closure line 23.

Furthermore, the positive-pressure line 26 branches off from the pressure line 16, which positive-pressure line likewise opens into the tank line 9. In the positive-pressure line 26 there is provided a positive-pressure valve 27 which opens above a predefined pressure in order to avoid inadmissible pressure states in the positive-pressure line 16.

The invention claimed is:
1. An actuating drive for a regulation valve, comprising:
a working cylinder;
a spring;
a piston having a piston rod disposed in said working cylinder, said piston rod forming an actuator for the regulation valve, said piston delimiting a first pressure chamber with a first pressure port and a second pressure chamber with a second pressure port, for displacing said piston with said piston rod counter to a force of said spring assigned to said working cylinder by pressurization of said first pressure chamber by introduction of a pressurized working medium via said first pressure port;
an external working medium circuit to which said working cylinder is connected by means of said first and second pressure ports for introducing the pressurized working medium into, or discharging the pressurized working medium from, said first and second pressure chambers, said external working medium circuit having a tank line, a pressure line, a motor and a working medium pump driven by means of said motor, said working medium pump having a suction side and a pressure side and is, by means of said pressure side, connected in working-medium-conducting fashion via said pressure line to said first pressure port and is, by means of said suction side, connected via said tank line to said second pressure port; and
a short-circuit line, said first pressure chamber being connected in permanent fluid communication with said second pressure chamber via said short-circuit line.

2. The actuating drive according to claim 1, further comprising a throttle with a constant flow cross section disposed in said short-circuit line.

3. The actuating drive according to claim 1, further comprising one of a throttle with a variably adjustable flow cross section or a regulation valve, disposed in said short-circuit line.

4. The actuating drive according to claim 1, wherein said external working medium circuit has a fast-closure line with a fast-closure valve that branches off from said pressure line and opens into said tank line, wherein said fast-closure valve is an unregulated open/closed valve which has only two switching positions, specifically a first switching position, in which said fast-closure valve shuts off a flow cross section of said fast-closure line, and a second switching position, in which said fast-closure valve opens up the flow cross section of said fast-closure line.

5. The actuating drive according to claim 1, wherein said external working medium circuit has a valve and a reversing line branching off from said tank line and opening into said pressure line, wherein said valve is a check valve which shuts off in a direction of said tank line or is a shut-off valve, disposed in said reversing line.

6. The actuating drive according to claim 1, further comprising a working medium reservoir for a compensation of volume fluctuations is connected to said tank line.

7. The actuating drive according to claim 1, wherein said external working medium circuit has a positive-pressure line with a positive-pressure valve that branches off from said pressure line and opens into said tank line.

8. The actuating drive according to claim 1, wherein said motor is a variable-rotational-speed motor.

9. The actuating drive according to claim 1, wherein said working medium pump can be operated as a hydraulic motor and said motor can be operated as a generator.

10. The actuating drive according to claim 1, wherein said short-circuit line is connected, in parallel with respect to said pressure line and said tank line, to said working cylinder, and/or is integrated into said working cylinder.

11. The actuating drive according to claim 1, wherein said motor is an electric motor.

12. A method for operating an actuating drive for a regulation valve, the actuating drive containing a working cylinder, a spring and a piston having a piston rod disposed in the working cylinder, the piston rod forming an actuator for the regulation valve, the piston delimiting a first pressure chamber with a first pressure port and a second pressure chamber with a second pressure port, for displacing the piston with the piston rod counter to a force of the spring assigned to the working cylinder by pressurization of the first pressure chamber by introduction of a pressurized working medium via the first pressure port, the actuating drive further having an external working medium circuit to which the working cylinder is connected by means of the first and second pressure ports for introducing the pressurized working medium into, or discharging the pressurized working medium from, the first and second pressure chambers, the external working medium circuit having a tank line, a pressure line, a motor and a working medium pump driven by means of the motor, the working medium pump having a suction side and a pressure side and is, by means of the pressure side, connected in a working-medium-conducting fashion via the pressure line to the first pressure port and is, by means of the suction side, connected via the tank line to the second pressure port, the first pressure chamber being permanently connected in permanent fluid communication with the second pressure chamber via said short-circuit line, which comprises the step of:

operating the working medium pump permanently and the pressurized working medium is conveyed from the pressure side of the working medium pump to the suction side of the working medium pump via the short-circuit line.

13. The method according to claim 12, which further comprises conveying the pressurized working medium both into and out of the first pressure chamber by means of the working medium pump.

14. The method according to claim 12, wherein the working medium pump, when conveying the pressurized working medium out of the first pressure chamber, is operated as a hydraulic motor and drives the motor as a generator.

* * * * *